(12) United States Patent
Kamat (10) Patent No.: US 8,984,606 B2
(45) Date of Patent: Mar. 17, 2015

(54) RE-AUTHENTICATION

(75) Inventor: Maruti Haridas Kamat, Bangalore Kamataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 263 days.

(21) Appl. No.: 13/335,035

(22) Filed: Dec. 22, 2011

(65) Prior Publication Data

US 2013/0167211 A1    Jun. 27, 2013

(51) Int. Cl.
*G06F 15/16* (2006.01)
(52) U.S. Cl.
USPC .............................................. 726/7
(58) Field of Classification Search
USPC .............................................. 726/7
See application file for complete search history.

(56) References Cited

U.S. PATENT DOCUMENTS

| | | | |
|---|---|---|---|
| 6,161,185 A * | 12/2000 | Guthrie et al. | 726/5 |
| 7,475,421 B2 | 1/2009 | Abdo et al. | |
| 7,587,751 B2 | 9/2009 | Potter et al. | |
| 7,716,721 B2 | 5/2010 | Zavalkovsky et al. | |
| 8,209,749 B2 * | 6/2012 | Babula et al. | 726/15 |
| 2004/0111520 A1 * | 6/2004 | Krantz et al. | 709/229 |
| 2005/0102529 A1 * | 5/2005 | Buddhikot et al. | 713/200 |
| 2008/0092214 A1 | 4/2008 | Zavalkovsky et al. | |
| 2008/0134308 A1 | 6/2008 | Yalakanti et al. | |
| 2010/0128667 A1 * | 5/2010 | Russell | 370/328 |

OTHER PUBLICATIONS

Kim, J. et al.; "An Efficient and Scalable Re-authentication Protocol Over Wireless Sensor Network"; May 2011; vol. 57; Issue 2; pp. 516-522.
"AAA protocol" http://en.wikipedia.org/wiki/AAA_protocol; Feb. 2011; 3 pages.
"Configuring Reauthentication Based on Security Policy"; Access Manager, Version 5. Help—IBM Security; 5 pages.
Change Notification in Active Directory Domain Services; 3 pages.
Configuring IEEE 802.1x Port-Based Authentication; Chapter 9; 42 pages.
HP ProCurve Switch Software; http://www.observium.org/svn/ob-server/trunk/mibs/HP-USER-AUTH; Mar. 2010; 69 pages.
Jagadeesan, H. et al.; "A Novel Approach to Design of User Re-authentication Systems"; Sep. 28-30, 2009: pp. 1-6.
Microsoft RADIUS authentication and authorization phases: http://msdn.microsoft.com/en-us/library/bb89198(VS.85).aspx; 3 pages.
RFC 3580—IEEE 802.1x Remote Authentication Dial In User Services (RADIUS) Ussage; 31 pages.

* cited by examiner

*Primary Examiner* — Esther B Henderson
(74) *Attorney, Agent, or Firm* — Hewlett-Packard Patent Department (57) ABSTRACT

In one example, a method of managing access to a network includes receiving a network access request including one or more credentials via an edge device. The one or more user credentials are authenticated, and a database record for a user associated with the one or more user credentials is identified. A re-authentication duration value is obtained from the database record for the user, wherein the re-authentication duration value is pre-assigned to the user or pre-assigned to a group associated with the user. A response comprising the re-authentication duration value is then sent to the edge device.

17 Claims, 4 Drawing Sheets

RE-AUTHENTICATION

BACKGROUND

When a user desires to access network resources, the user is typically subjected to an authentication process to verify that the user is permitted to access the network. Upon successful authentication, the user is granted access to the network. Such access, however, may not be for an unlimited duration, as re-authentication may be periodically conducted to ensure that the user accessing the network is the same user authenticated at the beginning of the session.

BRIEF DESCRIPTION OF THE DRAWINGS

Example embodiments are described in the following detailed description and in reference to the drawings, in which.

DETAILED DESCRIPTION

Various embodiments described herein provide a novel and previously unforeseen approach to network re-authentication. In particular, and as described in greater detail below, various embodiments improve upon the conventional port-specific and global re-authentication approaches by at least providing variable re-authentication for different users and/or groups connected to the same port of a network edge device, as well as by implementing procedures to rapidly respond to modifications in a user profile and/or access policy during a user session.

Conventionally, re-authentication involves periodically re-authenticating each user connected to an edge device based on a re-authentication duration value. This re-authentication duration value is port-specific (i.e., the re-authentication value is assigned to a port of an edge device) and global (i.e., all users connected to the port are re-authenticated at the same time based on the value). While this port-specific and global approach is sufficient for some environments, it may not be sufficient for other environments that require the re-authentication procedure to provide increased security, minimal impact on network traffic, differentiation among users/groups, and/or responsiveness to changes in user profiles and/or access policies. For example, in the conventional approach, if a network administrator desires higher security and therefore implements a low re-authentication duration value for a port (i.e., re-authentication occurs more often), security is increased, but at the expense of increased network traffic. By contrast, if the network administrator desires reduced network traffic and therefore implements a high re-authentication duration value for the port (i.e., re-authentication occurs less often), network traffic is decreased, but at the expense of reduced security. Furthermore, in the conventional approach, if a user profile and/or access policy is modified while a session is ongoing, re-authentication does not occur until the next scheduled authentication as determined by the re-authentication duration value set for the port. In instances where the re-authentication duration value is substantially long, this may pose security risks. For example, a user that leaves an organization may continue to have access to network resources even though the user is no longer associated with the organization. Similarly, if a user changes position within an organization, the user may continue to have access based on the user's old position as opposed to the user's new position.

Various embodiments described herein address at least the above by utilizing a re-authentication process that, among other things, provides increased security, reduced network traffic, differentiation among users, and/or responsiveness to changes in user profiles and/or access policies. More particularly, in various embodiments, when a user requests access to a network, an authentication server (e.g., a server implementing Remote Authentication Dial-In User Service (RADIUS)) verifies the credentials provided by the user. If the credentials are valid, a database record is checked to determine if a record is present for the user. If the user is present in the database record, a re-authentication duration value is obtained for the user from the database record. The authentication server then sends a response message (e.g., a Radius response per RFC 2865) to the edge device. The response message may include the RADIUS attribute SESSION-TIMEOUT set to the obtained re-authentication duration value, and the RADIUS attribute TERMINATION-ACTION set to RADIUS-REQUEST. The edge device, upon receiving the response message, implements the settings for the user without altering the re-authentication duration values for other users that are connected to the same port.

Accordingly, embodiments enable different users (or groups) connected to the same port to be re-authenticated at different time intervals. As a result, a network administrator can set re-authentication duration values on a user-by-user (or group-by-group) basis based on the potential security risk the user (or group) poses. For example, a guest may be assigned a high re-authentication duration value because the guest has a limited scope of access, while a faculty member may be assigned a low re-authentication duration value because the faculty member has greater access to resources on the network and therefore should be re-authenticated more often. Network traffic, consequently, is not unnecessarily increased due to a low global re-authentication duration value for all users connected to a port, and security is not compromised due to a high global re-authentication duration value for all users connected to a port, as is the case with conventional re-authentication approaches.

In addition to the above, after access is granted to the user (i.e., the user network session begins), embodiments utilize a policy server to listen for changes to user information in, e.g., a user repository like Active Directory or a database like a policy database. If information (e.g., a username, password, or access privileges) is changed, the policy server sends a message to the edge device. The message may be sent using, for example, Simple Network Management Protocol (SNMP), and may be configured to set a Management Information Base (MIB) object identifier (OID) on the edge device which causes the switch to immediately re-authenticate the user. As a result, if a user's information is changed during the user session so as to deny or limit access, the user will be immediately re-authenticated instead of waiting for the re-authentication timer to expire. Thus, embodiments address a security loop-hole associated with conventional re-authentication approaches.

In one embodiment of the present disclosure, a method is provided. The method comprises receiving, via an edge device, a network access request comprising one or more credentials. The one or more credentials are authenticated and a database record for the user associated with the one or more credentials is identified. The database record may comprise at least a user identifier, a group identifier, and a re-authentication duration value. The re-authentication duration value is then extracted from the database record for the user, where the re-authentication duration value is pre-assigned to the user or pre-assigned to a group associated with the user. A response comprising the re-authentication duration value is then sent to the edge device. The response may be a RADIUS response message with a SESSION-TIMEOUT attribute set to the re-authentication duration value, and a TERMINATION-ACTION attribute set to RADIUS-REQUEST. The response message causes the edge device to set a re-authentication timer on a port of the edge device for the user without changing the re-authentication timer for one or more other users connected to the port. After the user session begins, the method further comprises receiving a notification that one or more attributes associated with the user have been modified, and causing re-authentication of the user in response to the notification by setting a MIB OID on the edge device using SNMP.

In another embodiment of the present disclosure, a system is provided. The system comprises at least one server including at least one processor and at least one memory. The at least one memory stores instructions that when executed by the at least one processor causes the at least one server to locate a database record for a user associated with a network access request, and obtain a re-authentication duration value from the database record, where the re-authentication duration value indicates when the user is to be re-authenticated, and is pre-assigned to the user or pre-assigned to a group associated with the user. The instructions then cause the at least one server to send a response message comprising the re-authentication duration value, where the response message causes an edge device to set a re-authentication timer on a port of the edge device for the user without changing the re-authentication timer for one or more other users connected to the port. Thereafter, the instructions cause the at least one server to receive a notification that information associated with the user has been modified, and cause re-authentication of the user in response to the notification. The information associated with the user may comprise at least one of a user identifier, a user password, a re-authentication duration, a user group, a permitted access location, a permitted access time frame, an accept/reject status, a permitted user device, a virtual local area network setting, a quality of service setting, a permitted bandwidth setting, a rate limit setting, or a permitted network resource setting.

In still another embodiment of the present disclosure, a non-transitory computer-readable medium is provided. The non-transitory computer-readable medium includes instructions stored thereon (e.g., a part of a re-authentication application) that when executed cause at least one processing device to obtain a re-authentication duration value for a user from a database record, wherein the re-authentication duration value indicates when the user is to be re-authenticated, and wherein the re-authentication duration value is pre-assigned to the user or pre-assigned to a group associated with the user. The instructions then cause the at least one processing device to send a response message granting network access, wherein the response message comprises the re-authentication duration value, and wherein the response message comprises a RADIUS response message with a SESSION-TIMEOUT attribute set to the re-authentication duration value, and a TERMINATION-ACTION attribute set to RADIUS-REQUEST. The instructions further cause re-authentication of the user by setting a MIB OID on an edge device using SNMP prior to the time scheduled based on the re-authentication duration value in response to receiving a notification that information associated with the user has been modified.

Figure 1:
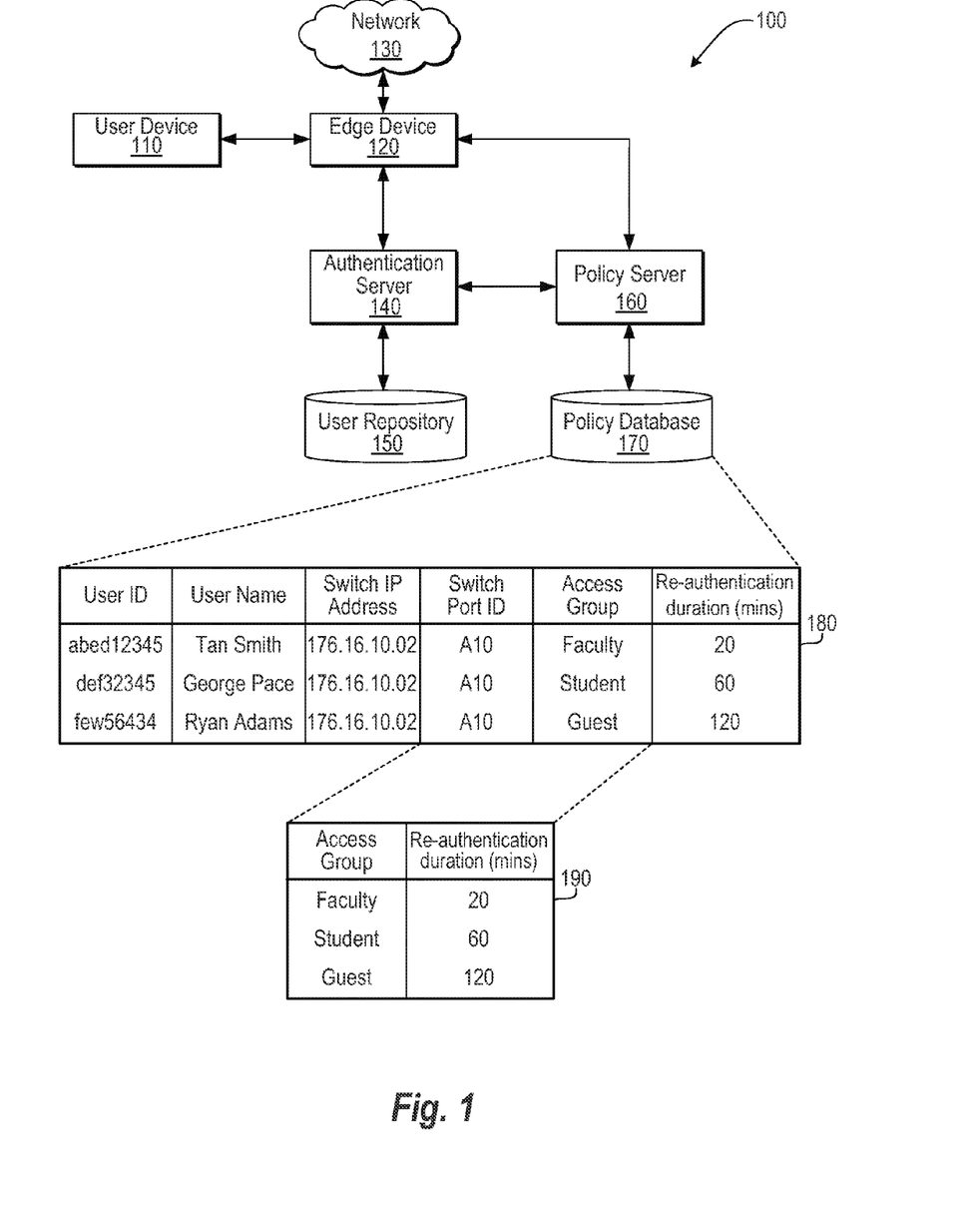
FIG. 1 depicts a block diagram of system in accordance with embodiments.

With reference to FIG. 1, there is shown a block diagram of a system 100 in which the above-mentioned re-authentication procedure may be implemented in accordance with embodiments. As shown, the system 100 comprises a user device 110, an edge device 120, a network 130, an authentication server 140, a user repository 150, a policy server 160, and a policy database 170, each of which are described in greater detail below. It should be readily apparent that the system depicted in FIG. 1 represents a generalized illustration and that other components may be added or existing components may be removed, modified, or rearranged without departing from a scope of the present disclosure. Further, it should be understood that the one or more components of FIG. 1 may be implemented via hardware and/or software. For example, one or more of the authentication server 140, user repository 150, policy server 160, and/or policy database 170 may be implemented as software modules running on a single hardware device, or, alternatively, as software modules running on separate hardware devices.

The user device 110, also known as a client device or network device, is a device that a user utilizes to gain access to the network 130 via the edge device 120. For example, the user device 110 may be a personal computer (PC), a laptop, a smart phone, a tablet, a terminal, or the like. The user device 110 may be connected to the edge device 120 via a wired or wireless connection.

The edge device 120 is an entry point to the network 130. For example, the edge device 120 may be a switch, router, access point, and/or gateway. The edge device 120 may employ the IEEE 802.1X standard to obtain information regarding the user device 110 and/or associated user. The edge device 120 may gather credentials via a web-based mechanism for obtaining a username and/or password. Further, the edge device 120 may obtain information related to the user device 110 such as the user device 110 Media Access Control (MAC) address.

The network 130 may be a collection of hardware and/or software interconnected by communication channels to allow for sharing resources and information. For example, the network may be a local area network (LAN), a wide area network (WAN), a storage area network (SAN), a virtual private network (VPN), a campus network, a metropolitan area network, the Internet, an Intranet, or the like.

The authentication server 140 may be a server configured to conduct authentication, authorization, and accounting (AAA) management for network access. In certain embodiments, the authentication server 140 may employ the RADIUS protocol—e.g., as described in RFC 2865 and 2866. The authentication server 140 may include an identity management agent (IMA) that is communicatively coupled to at least the policy server 160 and/or the policy database 170, and may utilize in-memory cache to store a copy of information included within the policy database 170. The IMA may function to intercept responses after the authentication process and input policy information such as a re-authentication duration value into the response before it is sent to the edge device 120.

The user repository 150 may be a directory service that includes a list of network users and may serve as a central location for network administration and security. The user repository 150 may include a directory table of active network users and may be populated by a network administrator. For example, the user repository 150 may be an Active Directory that stores information such as a username and password for each user, and this information may be used to verify credentials provided by a user via the user device 110. In some embodiments, the user repository 150 may be replaced by a database management system (DBMS) and a user database.

The policy server 160 may be a server configured to determine network access for a user being authenticated or already authenticated in the form of policies. That is, the authorization server 160 may determine the permissible operations and/or resources for a user being authenticated or already authenticated based on, e.g., information stored in the policy database 170.

The policy database 170, also known as a master authorization policy database or master authorization database, may be a database that stores security policy information for various resources. The policy database 170 may store the table 180 depicted in FIG. 1 or a variant thereof. As shown, the table 180 comprises a record for each user with a User ID, User Name, Switch IP Address, Switch Port ID, Access Group, and Re-Authentication Duration. The Access Group may indicate a particular group associated with the user (e.g., faculty, student, guest, etc.). The Re-Authentication Duration may specify when a user is to be re-authenticated. This value may be in form of a duration (e.g., every 20 second/minutes) and/or a particular time (12:00 a.m. daily). In some embodiments, the re-authentication duration value may be different for each user/group based on the date/time. For example, a user/group may have one re-authentication value for weekdays and a different re-authentication value for weekends. Similarly, the user/group may have one re-authentication value during peak network hours and a different value during off-peak hours. Accordingly, the network administrator can increase/decrease the re-authentication frequency based on potential network usage. In some embodiments, the re-authentication duration value may be set on a user-by-user basis. In other embodiments, the re-authentication duration value may be set on a group-by-group basis. Thus, as shown in table 190 of FIG. 1, the network administrator may set a different value for the faculty, student, and guest groups. These values may then be automatically associated with each user in table 180 based on their group designation. Absent the setting of a user or group re-authentication duration value, a default value may be associated with the user and/or group. Additionally or alternatively, no re-authentication duration value may be set for the user if there is no default or other value specified for the user.

With respect to the database record or tables in the policy database 170 shown in FIG. 1, it should be noted that information such as the edge device identifier and/or edge device port identifier may not be available in the database record prior to the user requesting access to the network. This is because the policy server 160 may not know from which edge device 120 and from which port of the edge device 120 the user will request access from. Such information may be entered in the database record after the user requests access and/or is granted access. More precisely, when an access request message is received from the user device 110 by the authentication server 140, the message may comprise various attributes like the edge device identifier (e.g., NAS-IP-Address), edge device port identifier (e.g., NAS-Port), edge device MAC address (e.g., Called-Station-ID), and/or user device MAC address (Calling-Station-ID). The authentication server 140 may then cause the database record in the policy database 170 to be updated with this information, Turning now to system 100 operations, the manner in which the above-described system 100 may operate in accordance with embodiments is discussed with respect to FIGS. 2 and 3. It should be readily apparent that the processes described in FIGS. 2 and 3 represent generalized illustrations, and that other processes may be added or existing processes may be removed, modified, or re-arranged without departing from the scope of the present disclosure.

Figure 2:
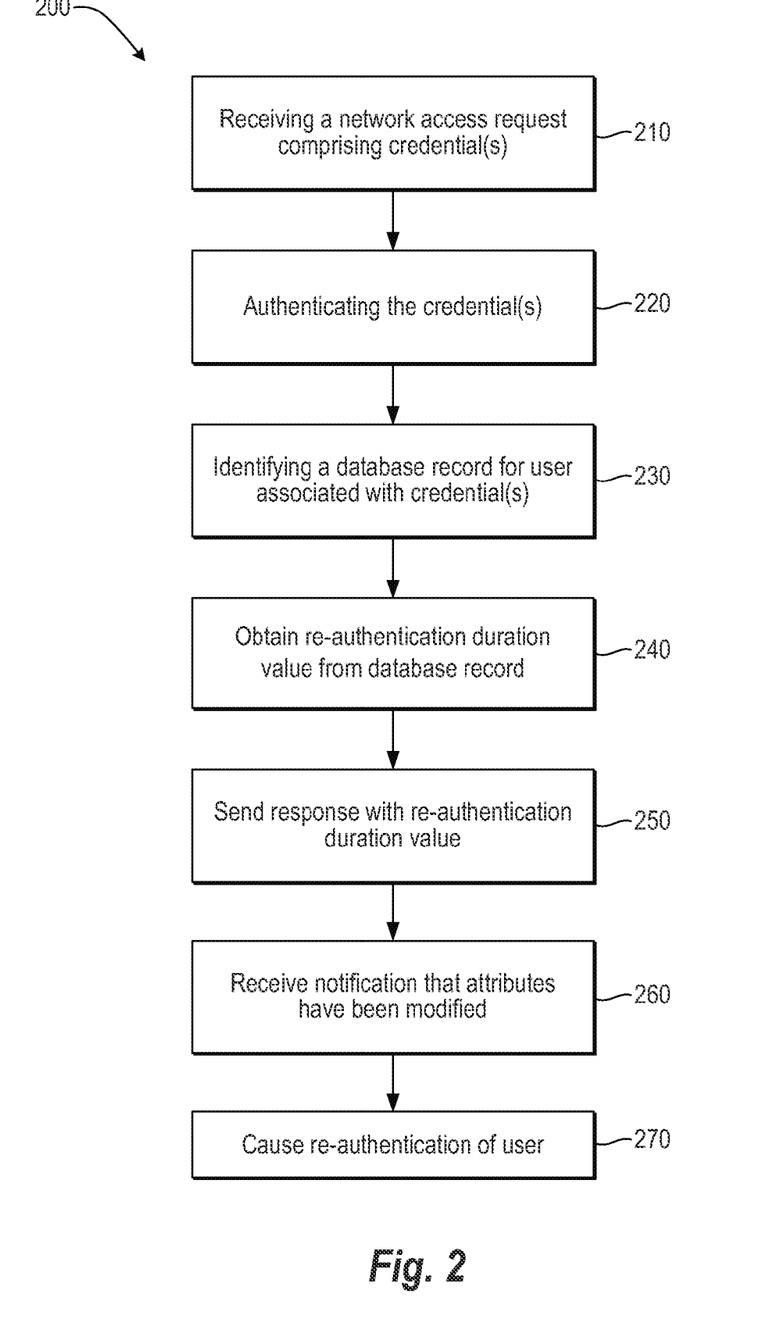
FIG. 2 depicts a process flow diagram of a method in accordance with embodiments.
Figure 3:
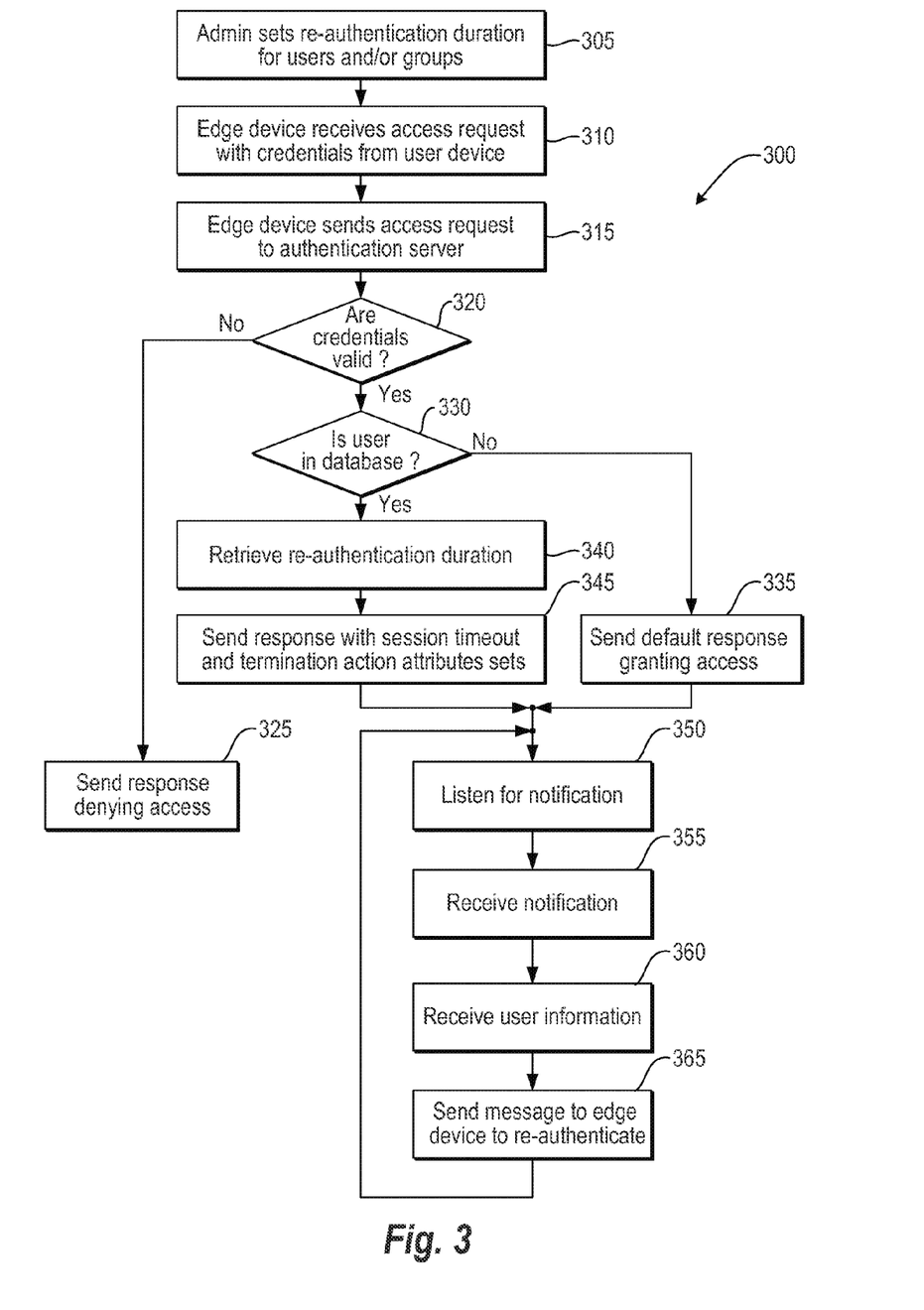
FIG. 3 depicts another process flow diagram of a method in accordance with embodiments.

FIG. 2 depicts a process flow diagram of a method 200 in accordance with embodiments. The method may be performed by one or more of the edge device 120, authentication server 140, user repository 150, policy server 160, and policy database 170, as shown in FIG. 1, and as described below. In particular, the illustrated elements denote "processing blocks" that may be implemented in logic. In one example, the processing blocks may represent executable instructions that cause the edge device 120, authentication server 140, user repository 150, policy server 160, and/or policy database 170 to respond, to perform actions, to change states, and/or to make decisions. The described processes may be implemented as processor executable instructions and/or operations provided by a computer-readable medium. In some embodiments, the processing blocks may represent functions and/or actions performed by functionally equivalent circuits like an analog circuit, a digital signal processor circuit, an application specific integrated circuit (ASIC), or other logic devices. FIG. 2, as well as the other figures, is not intended to limit the implementation of the described embodiments. Rather, the figures illustrate functional information that one skilled in the art could use to design/fabricate circuits, generate software, or use a combination of hardware and software to perform the illustrated processing.

The method 200 may begin at block 210, when the authentication server 140 receives a network access request originating at the user device 110 via the edge device 120. The network access request may include user credentials such as a username and/or password. Alternatively, the network access request may include credentials in the form of a digitally signed certificate. As mentioned above, the network access request may also include various attributes like the edge device identifier (e.g., NAS-IP-Address), edge device port identifier (e.g., NAS-Port), edge device MAC address (e.g., Called-Station-ID), and/or user device MAC address (Calling-Station-ID). At block 220, upon receiving the network access request, the authentication server 140 authenticates the received credentials. This may comprise the authentication server 140 verifying the credentials against those stored inside the user repository 150 (e.g., Active Directory). Alternatively, this may comprise the authentication server 140 verifying the credentials against those stored inside a database associated with a DBMS. At block 230, if the credentials are valid, the authentication server 140 identifies a database record for the user associated with the credentials provided with the network access request. The database record may be stored in the policy database 170, and a copy of the database record may be included in an IMA in-memory cache of the authentication server 140. As shown in FIG. 1, the database record may comprise information such as, e.g., a user identifier, a group identifier, and/or the re-authentication duration value. At block 240, the authentication server 140 (or the IMA associated therewith) obtains a re-authentication duration value from the database record for the user associated with the network access request and/or credentials. At block 250, the authentication server 140 sends a response message to the edge device 120 with the obtained re-authentication duration value. This response message causes the edge device 120 to set a re-authentication timer on a port of the edge device for the user without changing the re-authentication timer for one or more other users connected to the port. The response message may be in the form of a RADIUS response message per RFC 2865 with a SESSION-TIMEOUT attribute set to the re-authentication duration value, and a TERMINATION-ACTION attribute set to RADIUS-REQUEST. The SESSION-TIMEOUT attribute may inform the edge device 120 when re-authentication is to occur, and the TERMINATION-ACTION attribute may indicate what action is to occur with respect to the re-authentication. For example, a RADIUS response message with a SESSION-TIMEOUT attribute set to 20 minutes and a TERMINATION-ACTION attribute set to RADIUS-REQUEST may cause the edge device 120 to request network access credentials from the user every 20 minutes after the user begins the session.

Once the session begins, the policy server 160 listens to the user repository 150 and/or policy database 170 for changes associated with the user. More particularly, at block 260, if any of the user properties are changed (e.g., a user identifier, a user password, a re-authentication duration, a user group, a permitted access location, a permitted access time frame, an accept/reject status, a permitted user device, a virtual local area network setting, a quality of service setting, a permitted bandwidth setting, a rate limit setting, or a permitted network resource setting), the policy server 160 receives a notification that attributes have been modified. The policy server 160 then, at block 270, and in response to the notification, causes re-authentication of the user. In particular, the authentication server 140 may set a MIB OID on the edge device using, for example, SNMP, telnet, secure shell (SSH), or the like.

FIG. 3 depicts a more detailed process flow diagram of a method 300 in accordance with embodiments. The process may begin at block 305, when a network administrator sets a re-authentication duration value for particular users and/or groups. That is, the administrator may input different re-authentication duration values for individual users or for particular groups of users (e.g., student, faculty, guest, etc.) and for particular dates/times (e.g., work days/hours, holidays, weekends, nights, etc.). This may occur, for example, when the administrator is assigning users to particular groups and/or setting policies for users/groups in a policy database 170. Such policies may include the user/group VLAN attributes (i.e., the virtual local area network designated for the user/group), the user/group QoS attributes (i.e., the quality of service level designated for the user/group), the user/group bandwidth attributes (i.e., the amount of bandwidth the user/group may consume), the user/group rate limit attributes (i.e., the amount of traffic the user/group can introduce into the network 130) and/or the prioritization of network traffic (i.e., the priority level assigned to the user/group in comparison to other users/groups). Further, this may occur when the administrator is creating the user in a user repository like Active Directory and assigning values like username, user ID, and/or MAC address to the user.

At block 310, when a user desires to access the network 130, the edge device 120 receives an access request with credentials from the user device 110 via a wired or wireless connection. The credentials may be in the form of, e.g., a username, password, and/or digital certificate. Further, the access request may include various attributes like the edge device identifier (e.g., NAS-IP-Address), edge device port identifier (e.g., NAS-Port), edge device MAC address (e.g., Called-Station-ID), and/or device MAC address (Calling-Station-ID). At block 315, upon receiving the access request, the edge device 120, which may be configured for AAA, sends the request to the authentication server 140 (e.g., a Radius sever). The authentication server 140 may then, at block 320, verify that these credentials are valid against pre-configured values stored inside a user repository 150 or a user database and DBMS. If the credentials are determined to not be valid, at block 325, the authentication server 140 may send a response denying network access to the edge device 120. This response may be in the form of a Radius ACCESS-REJECT message. If, on the other hand, the credentials are valid, the authentication server 140 determines at block 330 if the user is present in a database record. In particular, an IMA of the authentication server 140 may store a copy of the database record from the policy database using in-memory cache. This database record may be checked to see if the user is present. If the user is not in the database record, at block 335, the authentication server 160 sends a response granting network access to the edge device 120. The response may be a Radius ACCESS-ACCEPT message granting access without a re-authentication duration value specified. More specifically, the SESSION-TIMEOUT and TERMINATION-ACTION may not be set in a Radius response message. Conversely, if the user is in the database record, at block 340, the re-authentication duration value is retrieved for the user. At block 345, the authentication server 140 sends the edge device 120 a Radius ACCESS-ACCEPT message with a SESSION-TIMEOUT attribute set to the re-authentication duration value, and a TERMINATION-ACTION attribute set to RADIUS-REQUEST. The SESSION-TIMEOUT attribute informs the edge device 120 when re-authentication is to occur, and the TERMINATION-ACTION attribute indicates what action is to occur with respect to the re-authentication. This response message causes the edge device 120 to set a re-authentication timer on a port of the edge device for the user without changing the re-authentication timer for one or more other users connected to the port. Furthermore, when the user is granted access, the authentication server updates the policy database 170 with the information associated with the user—e.g., edge device IP address, edge device port ID, and/or MAC address of the client device so that it may be used later.

Once the user session becomes active, the process then proceeds to block 350, where the policy server 160 listens for a change notification with regard to the user repository 150 or the policy database 170. A change may occur when, for example, a network administrator or other user/system modifies a user identifier, a user password, a re-authentication duration, a user group, a permitted access location, a permitted access time frame, an accept/reject status, a permitted user device, a virtual local area network setting, a quality of service setting, a permitted bandwidth setting, a rate limit setting, and/or a permitted network resource setting.

If such a change occurs, at block 355, the policy server 160 receives a change notification from the user repository 150 or the policy database 170. The change notification may be in the form of a lightweight directory access protocol (LDAP) message comprising a message identifier and/or the attributes of the object that were modified (e.g., objectGUID, name, displayName, distinguishedName, userPassword, accountExpires, memberOf, isDeleted, etc.). The policy server 160 may then, at block 360, check if the user is in the policy database 170 based on a information in the change notification, and retrieve user information from the database record in the policy database 170. Such information may include the edge device IP address, edge device port ID, user name/ID, and/or user device MAC address. The policy server 160, at block 365, may then proceed to send a message to the edge device 120 to, e.g., set the MIB OID so that the switch knows which user connected to a particular port is to be re-authenticated. The message may be in the form of, e.g., SNMP, telnet, or SSH. For example, the message may utilize the SNMP SET message, and may set the MIB variable hpicfUsrAuth-MacAuthClientReauthenticateMacAddress to the user device MAC address and hpicfUsrAuthPortReauthenticate to the switch port number to which the device is connected (e.g., on the hpicfUsrAuth MIB on HP5300 switch manufactured by Hewlett-Packard Inc.). To check if re-authentication was successful or not, hpicfUsrAuthMacAuthSessionState can be checked using the SNMP GET message. Alternatively, this may be accomplished by the policy server 160 executing a CLI command on the edge device through SNMP like switch # dot1x re-authenticate interface gigabiteethernet 0/1 on, e.g., Cisco catalyst 2960. The process then proceeds back to block 350, where the policy server 160 continues to listen for change notifications.

In some implementations, the policy server 160 may send the message to the edge device 120 via an agent. The agent may run on the same system as the policy server 160, be remote from the policy server 160, or be part of the edge device 120.

It should be noted that the above-mentioned SNMP approach may enable the system 100 to not have to utilize Change of Authorization (CoA) messaging per RFC 3576. This may reduce the cost associated with the system because CoA messaging requires that the edge device and authentication server support RFC 3576, which is not the case with commonly used RADIUS servers like Microsoft Internet Authentication Service (IAS) or Network Policy Service (NPS), as well as many edge devices. Hence, the approach of the present disclosure may be more easy and cost effective to implement with commonly used edge devices and authentication servers than an approach that relies on CoA messaging and RFC 3576.

Figure 4:
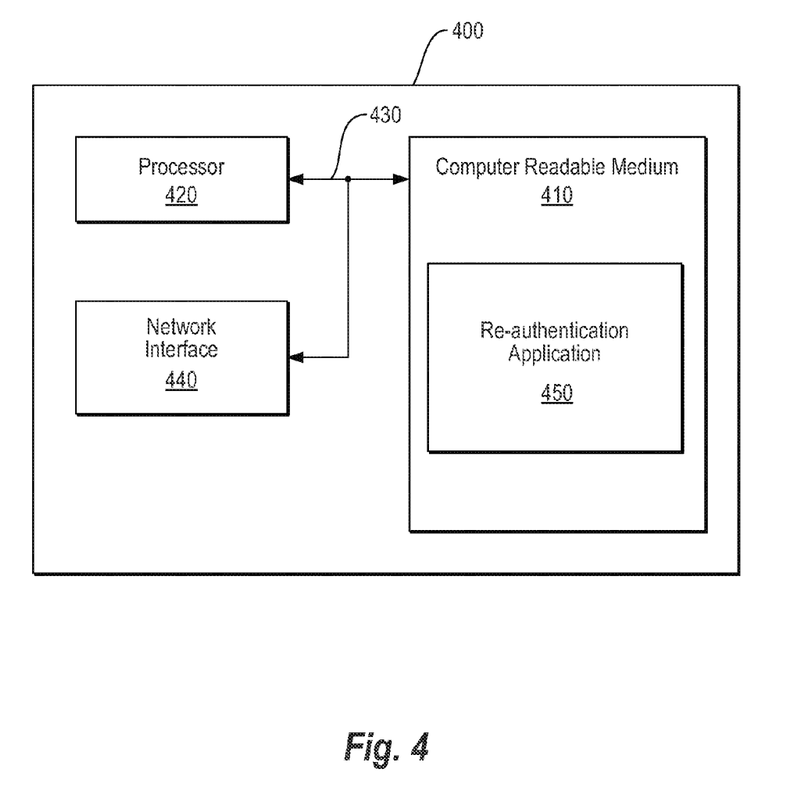
FIG. 4 is a block diagram showing a non-transitory computer-readable medium that stores machine readable instructions in accordance with embodiments.

Turning now to FIG. 4, there is shown a block diagram of a computing device 400, which may be employed to perform various functions of the authorization server 140, the user repository 150, the policy server 160, and/or the policy database 170 via a re-authentication application 450 stored thereon. The computing device 400 includes a non-transitory computer-readable medium 410, a processor 420, a bus 430, and a network interface 440.

The network interface 440 may be a device that provides the computing device 400 access to a network. For example, the network interface 440 may utilize hardware and/or software to connect to a local area network (LAN), a wide area network (WAN), a storage area network (SAN), a virtual private network (VPN), a campus network, a metropolitan area network, the Internet, an Intranet, or the like.

The non-transitory computer-readable medium 410 may store machine readable instructions, and may correspond to any typical storage device that stores instructions, codes, data, or other information. For example, the non-transitory computer-readable medium 410 may be one or more of a non-volatile memory, a volatile memory, and/or one or more storage devices. Examples of non-volatile memory include, but are not limited to, electronically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical devices, and flash memory devices.

The processor 420 generally retrieves and executes the instructions stored in the non-transitory computer-readable medium 410. In embodiments, the non-transitory computer-readable medium 410 may be accessed by the processing device 420 over the bus 430. In other embodiments, the non-transitory computer-readable medium 410 may be integrated with the processor 420.

The re-authentication application 450 of the computer-readable medium 410 may be executed by the processor 420 and thereby cause the processor 420 to implement the above-described operations discussed with respect to FIGS. 2 and 3. For example, the re-authentication application 450, when executed, may cause the processor 420 to obtain a re-authentication duration value for a user from a database record, wherein the re-authentication duration value indicates when the user is to be re-authenticated, and wherein the re-authentication duration value is pre-assigned to the user, or pre-assigned to a group associated with the user. The re-authentication application 450 may further cause the processor 420 to send a response message granting network access, wherein the response message comprises the re-authentication duration value. Thereafter, the re-authentication application 450 may cause the processor 450 to cause re-authentication of the user prior to the time scheduled based on the re-authentication duration value in response to receiving a notification that information associated with the user has been modified.

In summary, the above-described embodiments of the present disclosure provide a new and previously unforeseen re-authentication approach that, among other things, provides increased security, reduced network traffic, differentiation among users, and/or responsiveness to changes in user profiles and/or access policies.

The present disclosure has been shown and described with reference to the foregoing exemplary embodiments. It is to be understood, however, that other forms, details, and embodiments may be made without departing from the spirit and scope of the disclosure that is defined in the following claims.

What is claimed is:

1. A method of managing access to a network, the method comprising:
    receiving, via an edge device, a network access request comprising one or more credentials;
    authenticating the one or more user credentials provided in the network access request;
    identifying a database record for a user associated with the one or more user credentials, wherein the database record for the user comprises a user identifier, a group identifier, and a re-authentication duration value;
    obtaining re-authentication duration value from the database record for the user, wherein the re-authentication duration value is pre-assigned to the user or pre-assigned to a group associated with the user;
    sending, to the edge device, a response comprising the re-authentication duration value;
    receiving a notification that one or more attributes associated with the user have been modified; and
    causing re-authentication of the user in response to the notification.

2. The method of claim 1, wherein the response comprises a Remote Authentication Dial In User Service (RADIUS) response message with a SESSION-TIMEOUT attribute set to the re-authentication duration value.

3. The method of claim 2, wherein the response further comprises the RADIUS response message with a TERMINATION-ACTION attribute set to RADIUS-REQUEST.

4. The method of claim 1, wherein the response comprising the re-authentication duration value causes the edge device to set a re-authentication timer on a port of the edge device for the user without changing the re-authentication timer for one or more other users connected to the port.

5. The method of claim 1, wherein the one or more attributes associated with the user comprise attributes stored in a user repository or a database.

6. The method of claim 1, wherein causing re-authentication of the user comprises setting a Management Information Base (MIB) Object Identifier (OID) on the edge device using Simple Network Management Protocol (SNMP).

7. A system comprising:
   at least one server, the at least one server comprising at least one processor and at least one memory, the at least one memory storing instructions that when executed by the at least one processor cause the at least one server to
      locate a database record for a user associated with a network access request, wherein the database record for the user comprises a user identifier, a group identifier, and a re-authentication duration value;
      obtain the re-authentication duration value from the database record, wherein the re-authentication duration value indicates when the user is to be re-authenticated;
      send a response message comprising the re-authentication duration value;
      receive a notification that information associated with the user has been modified; and
      cause re-authentication of the user in response to the notification.

8. The system of claim 7, wherein the re-authentication duration value is pre-assigned to the user or pre-assigned to a group associated with the user.

9. The system of claim 7, wherein the information associated with the user is stored in a user repository or a database containing the database record.

10. The system of claim 9, wherein the information comprises at least one of a user identifier, a user password, a re-authentication duration, a user group, a permitted access location, a permitted access time frame, an accept/reject status, a permitted user device, a virtual local area network setting, a quality of service setting, a permitted bandwidth setting, a rate limit setting, and a permitted network resource setting.

11. The system of claim 7, wherein the response comprising the re-authentication duration value causes an edge device to set a re-authentication timer on a port of the edge device for the user without changing the re-authentication timer for one or more other users connected to the port.

12. A non-transitory computer-readable medium including instructions stored thereon that when executed cause at least one processing device to:

obtain a re-authentication duration value for a user from a database record, wherein the re-authentication duration value indicates when the user is to be re-authenticated, wherein the re-authentication duration value is pre-assigned to the user or pre-assigned to a group associated with the user, and wherein the database record for the user comprises a user identifier, a group identifier, and the re-authentication duration value;

send a response message granting network access, wherein the response message comprises the re-authentication duration value; and cause re-authentication of the user prior to the time scheduled based on the re-authentication duration value in response to receiving a notification that information associated with the user has been modified.

13. The non-transitory computer-readable medium of claim 12, wherein the response comprises a Remote Authentication Dial In User Service (RADIUS) response message with a SESSION-TIMEOUT attribute set to the re-authentication duration value, and a TERMINATION-ACTION attribute set to RADIUS-REQUEST.

14. The non-transitory computer-readable medium of claim 12, wherein the information associated with user is stored in a user repository or database.

15. The non-transitory computer-readable medium of claim 14, wherein the information comprises at least one of a user identifier, a user password, a re-authentication duration, a user group, a permitted access location, a permitted access time frame, an accept/reject status, a permitted user device, a virtual local area network setting, a quality of service setting, a permitted bandwidth setting, a rate limit setting, and a permitted network resource setting.

16. The non-transitory computer-readable medium of claim 12, wherein the instructions cause the at least one processor to cause re-authentication of the user by setting a Management Information Base (MIB) Object Identifier (ND) on an edge device using Simple Network Management Protocol (SNMP).

17. The non-transitory computer-readable medium of claim 12, wherein the response message comprising the re-authentication duration value causes an edge device to set a re-authentication timer on a port of the edge device for the user without changing the re-authenticate one or more other users connected to the port.

\* \* \* \* \*

UNITED STATES PATENT AND TRADEMARK OFFICE
CERTIFICATE OF CORRECTION

Page 1 of 1

PATENT NO. : 8,984,606 B2
APPLICATION NO. : 13/335035
DATED : March 17, 2015
INVENTOR(S) : Maruti Haridas Kamat

It is certified that error appears in the above-identified patent and that said Letters Patent is hereby corrected as shown below:

On the title page, item (75), Inventors, in column 1, line 2, delete "Kamataka" and insert -- Karnataka --, therefor.

In the claims

In column 12, line 38, in Claim 16, delete "(ND)" and insert -- (OID) --, therefor.

Signed and Sealed this
Twentieth Day of October, 2015

Michelle K. Lee
*Director of the United States Patent and Trademark Office*